United States Patent

Linville

[15] 3,694,024
[45] Sept. 26, 1972

[54] VERTICALLY EXPANSIBLE CARGO VEHICLE BODY

[72] Inventor: Richard O. Linville, Warren, Mich.

[73] Assignee: The Budd Company, Philadelphia, Pa.

[22] Filed: Dec. 24, 1970

[21] Appl. No.: 101,351

[52] U.S. Cl. ......................................... 296/26, 52/66
[51] Int. Cl. ............................................... B60p 9/00
[58] Field of Search .............. 296/26, 27, 23 C; 52/66

[56] References Cited

UNITED STATES PATENTS

| | | | |
|---|---|---|---|
| 2,656,216 | 10/1953 | Bobroff | 296/23 C |
| 3,494,655 | 2/1970 | Linton | 296/23 C |
| 2,581,556 | 1/1952 | Rogers | 296/23 C |
| 3,061,358 | 10/1962 | Lien | 296/26 |
| 2,879,103 | 3/1959 | Hall | 296/23 C |

Primary Examiner—Philip Goodman
Attorney—Thomas I. Davenport, Edward M. Farrell, John D. Sowell and William R. Nolte

[57] ABSTRACT

This application discloses a cargo vehicle body which is vertically expansible, having a fixed lower part or portion carried on a chassis and a vertically shiftable upper part or portion in spaced guided telescopic relationship with the lower portion, with elevating and guide means disposed in the space between the telescopic sides and, when desired, resilient or spring means to assist in supporting the upper portion at least in certain positions and latch means for assisting in holding the upper body portion in raised positions and releasable for lowering it. A plurality of lift, guide, spring, and latch means are provided on each side in an effective arrangement to promote smooth even balanced operation. A door is provided which is effective to close its opening in all adjusted positions of the body.

1 Claim, 4 Drawing Figures

INVENTOR.
RICHARD O. LINVILLE
BY
Edward M Farrell
ATTORNEY

VERTICALLY EXPANSIBLE CARGO VEHICLE BODY

BACKGROUND OF INVENTION

Previously there have been proposals for adjusting body enclosures, the best known probably being for camping trailers. There have been some proposals for extensible cargo body trailers but, so far as known, they have involved shifting mechanisms acting against the roadway or ground and otherwise different from what is disclosed herein.

There are a number of advantages in having a vertically expansible cargo vehicle body. It provides high volume capacity for bulky loads when raised and low volume for denser and heavier goods when lowered. When the vertical size is reduced the center of gravity is lowered and the body is less likely to tip over; the wind resistance and fuel consumption are reduced; side wind buffeting and steering difficulties are reduced; bridge, wire and tree clearance height is reduced, often at great savings in routing; and the body is stronger and the vehicle easier to handle. When the body is raised it makes loading easier, when either large or small bulk cargo is handled.

SYNOPSIS OF INVENTION

According to the present invention the elevating mechanism is disposed in the space between telescoping sides; also guide means are provided in this space, preferably intermediate the elevating units; and, when desired, resilient or spring means are provided in this space to carry part of the weight of the upper portion, especially when in lowered position, and cushion the upper portion in travel to decrease noise and reduce wear on the elevating and guide means; also latch means, when desired. A roll type door or closure is provided to effectively close the body opening in any position of the body parts.

DRAWINGS

The objects of the invention, as well as various features of novelty and advantages, will be apparent from the following description of an exemplary embodiment thereof, reference being made to the accompanying drawings, wherein.

SPECIFIC DESCRIPTION

Figure 1:
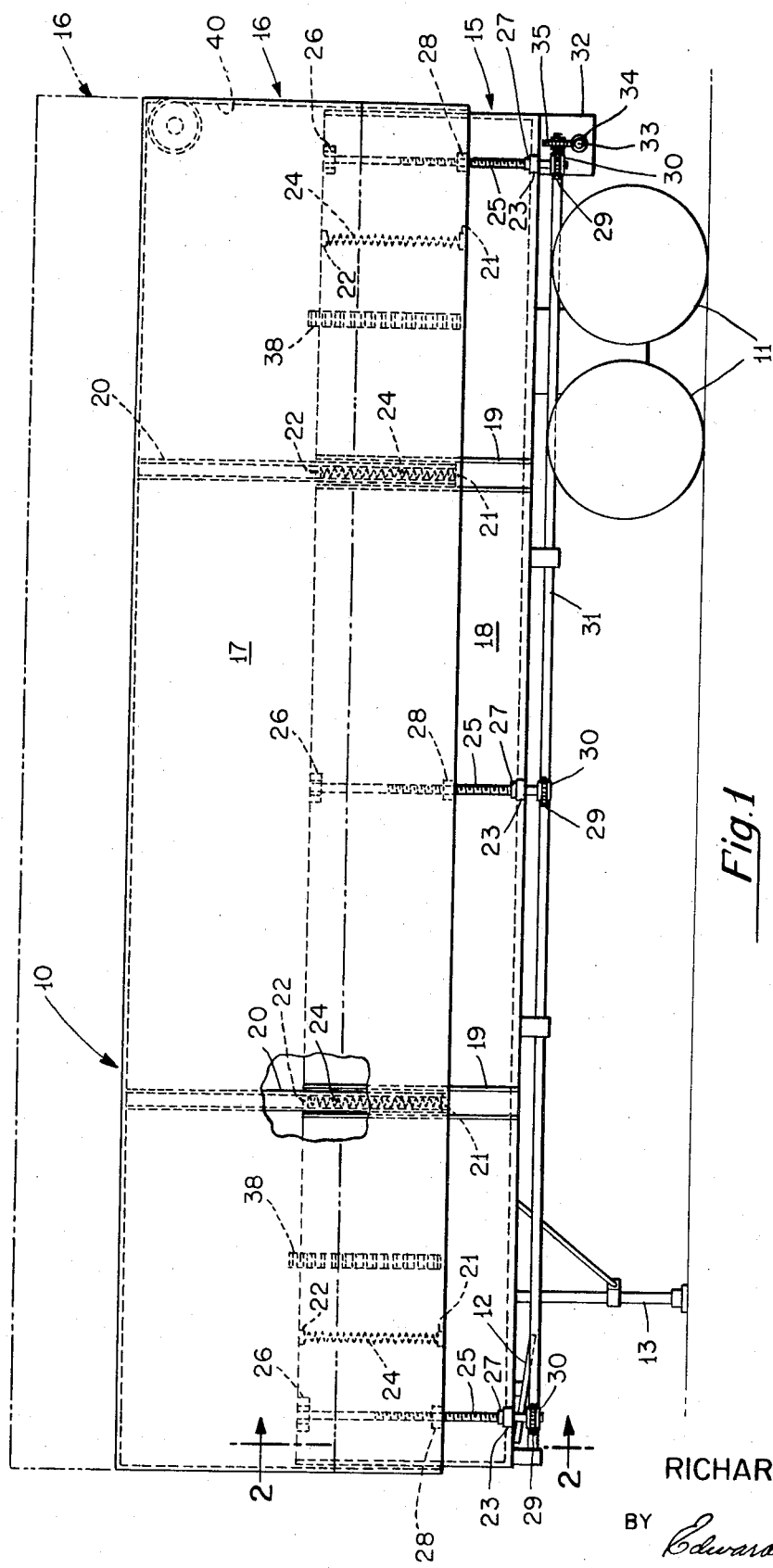
FIG. 1 is a side elevation, largely diagrammatic, showing an expansible vehicle cargo trailer body embodying the invention.

Referring to the drawings, the vehicle trailer body is generally designated by the numeral 10. It is carried on wheels 11, has coupling means 12 with a tractor, and swingable front end leg supports 13 of known type. A fixed lower body part or portion 15 is open at the top and carries an upper elevatable body part or portion 16 telescopically shiftable thereon. Preferably the upper body portion is disposed outside the lower body portion for weather protection.

Figure 2:
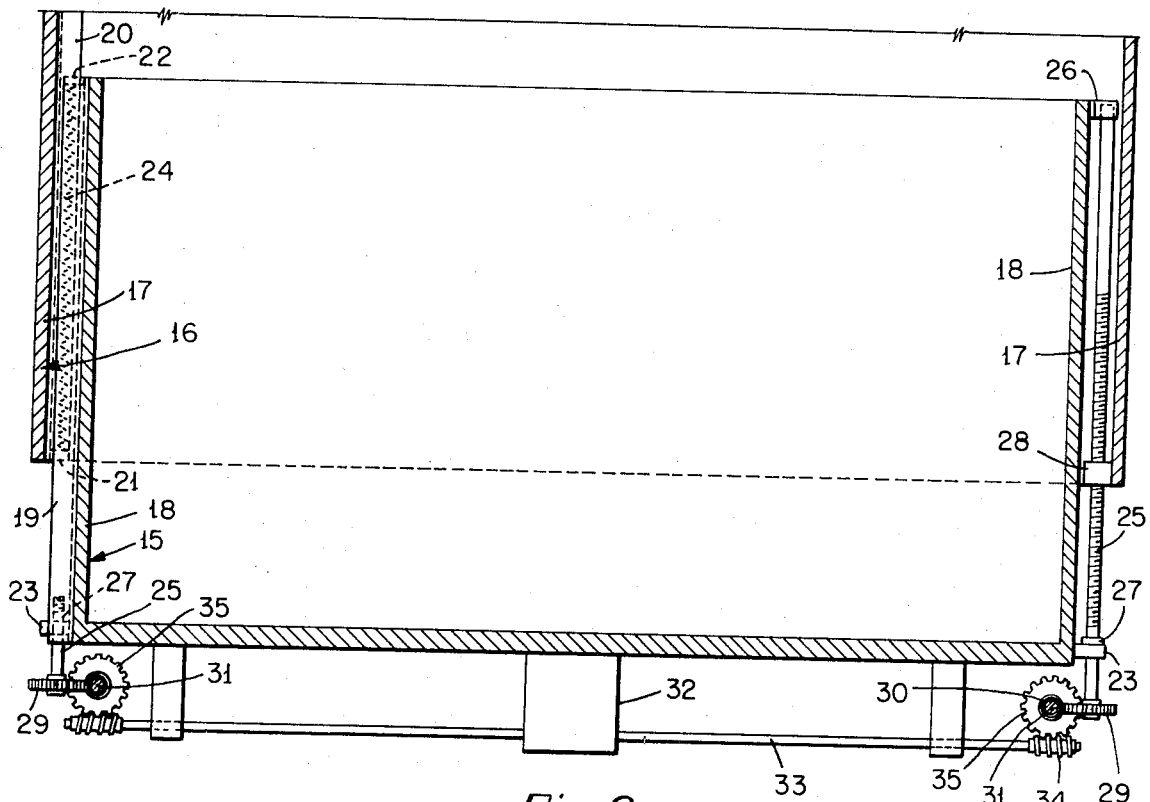
FIG. 2 is a transverse vertical section taken on the line 2—2 on one side and at another point on the other side.

As shown in FIG. 2, the longitudinal sides 17 of the upper body part 16 are spaced a considerable distance from the sides 18 of the lower body part 15 and this space is used to receive and protect the elevating, guiding, lift-assisting, and latch means and to protect them from cargo or other material which might foul them.

The guide means comprises telescopic strut slide elements 19, 20, one 19 being carried by the lower part 15 and the other 20 by the upper part 16. These telescopic slide-guide elements may be tubular or other shapes but are shown as channels with their back webs secured to the sides of the body parts, as by welds, bolts, or the like.

The lower edges of the sides of the upper body part are provided with inturned flanges 21 extending close to the sides of the lower body part; and the upper edges of the lower body part 15 are provided with outturned flanges 22 extending close to the sides of the upper body part. In addition, the lower body part 15 is provided with a lower outturned flange 23 to assist in supporting the elevating mechanism. The flanges may be angle members which are secured to the sides by welding, bolting or riveting, or the like, to aid assembly. The telescopic strut elements 20 of the upper body part extend through the flanges 21 and upward so as to have sufficient length to be fully effective in all positions of the body parts and to stiffen the sides of the upper body part. If desired, the channel guide members 20 of the upper body part may be closed on their inner open sides, or the channels 19 of the lower body part may have caps at their upper ends within the channels 20, to prevent the entry of cargo material or other material from above the lower body part.

Counterbalance and support-assisting means, such as springs 24, when desired, may be provided between the longitudinal vertical sides of the upper and lower body parts. They may be sucured at any locations along the side flanges, and some are shown intermediate the lift and guide units, and may be either tension or compression springs. They are shown as tension springs secured between the upper flanges 21 of the lower body part, or a cap plate within the channel member 19, and the flanges 22 of the lower body part within the telescopic strut guide members, or a plate within the channel members 20. If boxing the channel guide struts interferes with location within the guide channels the springs, as many as desired, may be disposed intermediate the lift units and guide strut units, as mentioned above. The springs are most effective when the upper body part is in its lowest position and may be compressed when the upper body part is in its top position.

If compression springs are used they, likewise, will be located or most effective in the lowest position of the upper body part.

The elevating means can be of various types, such as cable and pulley, rack and pinion, pantograph and screw, screw and nut, and the like. The screw and nut type is illustrated herein because it requires the least space, holds securely in any position against back drive, is easiest to operate, and is usually simplest to procure and install. The lift means, of whatever type, will preferably have its parts of greatest plane dimension, such as pulleys, gears and pantograph, aligned longitudinally so as to take the least space between the sides of the body parts.

As shown, the elevating means at each point comprises a vertical screw shaft 25 operating in bearings 26 on the flanges 22 and in bearings 27 on flange 23 of the lower body part, collars as needed being provided to hold the screw shaft against axial movement. The flange 21 of the upper body part is provided with a nut 28, preferably of the ball race type, in which the screw shaft turns to move the nut and body part up and down.

At its lower end the screw shaft 25 is provided with a worm gear 29 which is driven by a worm pinion 30 carried fast on a longitudinal shaft 31. The shaft 31 on each side is mounted in suitable bearings and carries pinions 30 for the screw shafts of all the elevating units on that side.

The shafts for both sides can be driven in unison by various drive means, that shown comprising a motor-gear unit 32 driving a transverse shaft 33 which at the ends drives the shafts 31 by a worm pinion 34 on shaft 33 and a worm gear 35 on shaft 31. If desired, the lift screw shafts may also, or instead of the springs, be mounted in the guide units.

The operation will be clear from the above description. When the motor-gear unit 32 drives the transverse shaft 33 it drives the shafts 31 through the worm gear sets 34, 35 and the shafts 31 drive all of the vertical screw shafts 25 through worm gear sets 29, 30 to move the nuts 28 and the upper body part up and down as desired. It will be obvious that the worm gear sets do not have back drive hence hold the parts securely in any adjusted position. When the springs 24 are provided they take some of the weight and wear off the lift drive means, particularly in the lowermost position of the upper body part.

Figure 3:
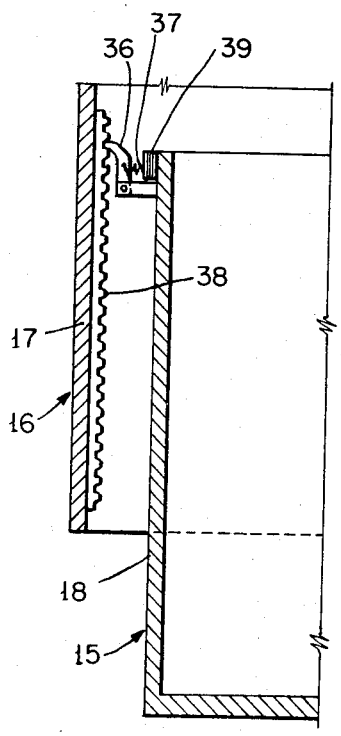
FIG. 3 is a partial enlarged section showing detent and release latch means for supporting the upper body part.

If desired, holding latches can be provided for locking the upper body part in adjusted positions. If the detent latches 36, FIG. 3, are biased, as by springs 37, toward holding position and released by electromagnets 39 or the like they can all be operated together by a single hand control or can be pulled out whenever the motor is energized for operating the elevating means.

FIG. 1 shows how a roll door 40 which is mounted on the upper body part can be pulled down to cover a door aperture of any height which may be established by the height of the upper body part.

Figure 4:
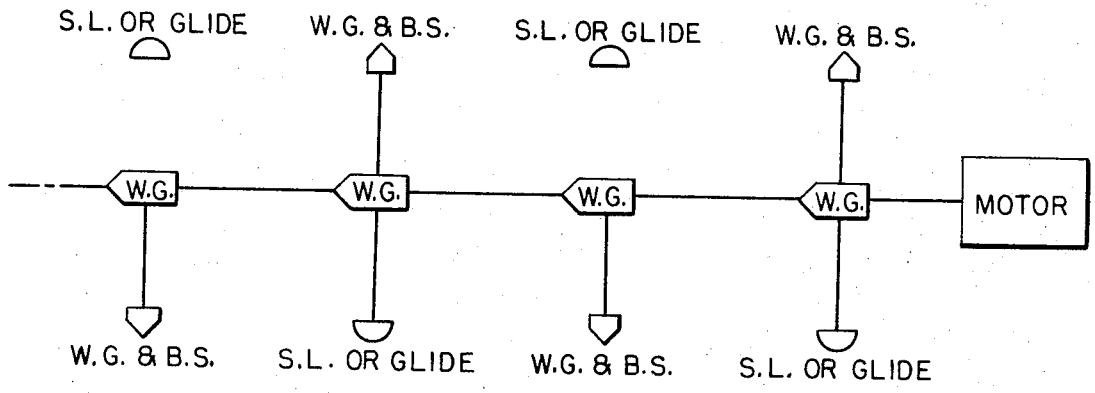
FIG. 4 is a plan diagram showing another arrangement of the lift and guide units.

In FIGS. 1 and 2 the lift drive gear shaft units 25 and the guide and spring units 19, 20, 24 are arranged directly opposite each other on opposite sides of the body. In FIG. 4 they are arranged in opposed staggered relationship. For a long body and a number of lift, guide and spring units this may give a more balanced and less binding action.

While the invention has been described in connection with illustrative embodiment, it is to be understood that there may be various embodiments and modifications within the general scope of the invention.

I claim:

1. A vertically expansible cargo body, comprising in combination, a lower body part, an upper body part telescopically mounted on the lower body part, a plurality of elevating units on each side between the lower body part and the upper body part, a plurality of guide units disposed between said elevating and guide units on opposite sides of said body, said elevating units and said guide units being disposed in staggered opposed relationship to each other respectively, said elevating units including vertical screw shafts and nuts along each side and a longitudinal shaft having worm gear set drive for each vertical shaft, and power means for driving the longitudinal shafts in unison.

* * * * *